US012185803B2

(12) United States Patent
Luo

(10) Patent No.: US 12,185,803 B2
(45) Date of Patent: Jan. 7, 2025

(54) BLUETOOTH AUDIO COMPONENT FOR AN UMBRELLA

(71) Applicant: Tempo Manufacturing LLC, Nantong (CN)

(72) Inventor: Xiong Luo, Nantong (CN)

(73) Assignee: Tempo Manufacturing LLC, Nantong (CN)

( * ) Notice: Subject to any disclaimer, the term of this patent is extended or adjusted under 35 U.S.C. 154(b) by 311 days.

(21) Appl. No.: 17/998,698

(22) PCT Filed: Aug. 12, 2020

(86) PCT No.: PCT/CN2020/108553

§ 371 (c)(1),
(2) Date: Nov. 14, 2022

(87) PCT Pub. No.: WO2021/237948

PCT Pub. Date: Dec. 2, 2021

(65) Prior Publication Data

US 2023/0189947 A1 Jun. 22, 2023

(30) Foreign Application Priority Data

May 28, 2020 (CN) ......................... 202010467912.5

(51) Int. Cl.
*A45B 3/04* (2006.01)
*A45B 23/00* (2006.01)
(Continued)

(52) U.S. Cl.
CPC ................ *A45B 3/04* (2013.01); *A45B 25/02* (2013.01); *H04R 1/02* (2013.01); *A45B 2023/0031* (2013.01)

(58) Field of Classification Search
CPC .. H04B 1/08; A45B 3/00; A45B 25/00; A45B 3/02; A45B 3/04; A45B 2023/005;
(Continued)

(56) References Cited

U.S. PATENT DOCUMENTS

2015/0216274 A1* 8/2015 Akin ........................ A45B 3/00 29/434
2018/0042346 A1* 2/2018 Kong ....................... H04B 1/08
(Continued)

*Primary Examiner* — Carolyn R Edwards
*Assistant Examiner* — Julie X Dang
(74) *Attorney, Agent, or Firm* — Wang Law Firm, Inc.

(57) ABSTRACT

A Bluetooth audio system for an umbrella comprises a column (1); an upper nest (2); a lower nest (3); a plurality of rods (4); a plurality of LED light bars (8); a solar panel (5); and the Bluetooth audio system (6), wherein the Bluetooth audio system further comprises a housing (6*a*) having a conductive interface (67) electrically connected to the output end of the solar panel (5) and the input end of the battery (63); a battery (63); and a speaker (64); a lamp plate (6*b*) with a plurality of lamps inside is connected to the bottom surface of the housing (6*a*); a Bluetooth audio switch (30) and a lighting switch (40) for controlling the lamps and the plurality of LED light bars (8) are mounted on the housing (6*a*). The invention has simple, compact and reasonable structure, convenient operation, and strong practicability. It can be used alone or as an outdoor umbrella accessory.

9 Claims, 7 Drawing Sheets

(51) Int. Cl.
*A45B 25/02* (2006.01)
*H04R 1/02* (2006.01)

(58) Field of Classification Search
CPC ...... A45B 2200/109; A45B 2023/0037; A45B 2023/0012; A45B 2200/1018; A45B 2200/1027; A45B 25/02; A45B 2023/0031; H04R 2420/07; H04R 1/028; H04R 1/02; H02J 7/35
See application file for complete search history.

(56) References Cited

U.S. PATENT DOCUMENTS

| | | | | |
|---|---|---|---|---|
| 2019/0292805 | A1* | 9/2019 | Gharabegian | H02S 20/30 |
| 2019/0338837 | A1* | 11/2019 | Gharabegian | F16H 19/06 |
| 2020/0066266 | A1* | 2/2020 | Gharabegian | H04N 23/90 |

* cited by examiner

BLUETOOTH AUDIO COMPONENT FOR AN UMBRELLA

TECHNICAL FIELD OF THE INVENTION

The invention relates to an accessory of an umbrella, in particular to a Bluetooth audio system for an umbrella.

BACKGROUND OF THE INVENTION

As an outdoor leisure appliance, umbrella is widely used in square, beach, park, courtyard and other leisure places, providing people with comfortable cool space. The existing umbrella generally comprises a canopy, a middle column and a cap. The canopy is disposed between the middle column and the cap. The middle column has a frame for supporting the canopy, and the frame is hinged with the middle column. The existing umbrellas on the market only have the function of sunshade and rain proof, and the function is relatively single. At present, there are also multi-functional umbrellas.

After searching, a Chinese patent CN207836953U (patent No.: CN201820049294.0) disclosed "a new type of solar umbrella" is found. The umbrella comprises a waterproof cover, a flexible solar film, a piece of heatproof fabric, a foldable rod, a movable column, a fixed column, a base and a locking knob. The movable column is of a structure raised in the middle and hollow inside, and is in threaded connection with the waterproof cover at its top and formed with a wire hole on its upper side, the foldable rods are sleeved at a position below the wire hole of the movable column, a plurality of slots and a plurality of USB interfaces are disposed on an upper portion of the movable column, and a USB fan and an LED light may be plugged in the slots. A lower portion of the movable column is sleeved inside the fixed column, and an inner side of the heatproof fabric is mounted on the foldable rods while an outer side thereof is connected to buckles on an inner side of the flexible solar film. The solar-powered umbrella has the functions of light and fan, but its structure is complicated, so the movable column needs to be provided additionally. The USB fan and the LED light are plugged in the slots of the movable column, and the LED light needs to be plugged in and out frequently, so that this structure is less convenient to use.

Bluetooth audio is a built-in Bluetooth chip, which replaces the traditional wire connected audio device with Bluetooth connection. It is convenient and fast to connect with Bluetooth playback devices such as mobile phones, tablets and notebooks. At present, Bluetooth audio is also mounted on the umbrella, but the structure integrating Bluetooth audio and lighting has not yet been reported.

SUMMARY OF THE INVENTION

It is an object of the present invention is to provide a Bluetooth audio system for an umbrella with simple and reasonable structure and convenient disassembly and use.

For achieving the above object, the Bluetooth audio system for an umbrella, the umbrella comprises a column; an upper nest having a top, the upper nest being attached to the column; a lower nest having a bottom, the lower nest being mounted on the column; a plurality of rods connected to the upper nest; a plurality of LED light bars mounted on the plurality of rods; a solar panel having an output end mounted on the top of the upper nest; and the Bluetooth audio system; wherein the Bluetooth audio system comprises a housing having a bottom surface detachably mounted at the bottom of the lower nest of the umbrella; a battery having an input end disposed inside the housing; and a speaker disposed inside the housing; the housing has a conductive interface electrically connected to the output end of the solar panel and the input end of the battery; a lamp plate with a plurality of lamps inside is connected to the bottom surface of the housing; and a Bluetooth audio switch and a lighting switch for controlling the lamps inside the lamp plate and the plurality of LED light bars disposed on the rods are mounted on the housing.

Preferably, the housing comprises a left half-annular housing with two vertical surfaces and a right half-annular housing with two vertical surfaces, the left half-annular housing and the right half-annular housing are positioned with the bottom of the lower nest with each vertical surface of the left half-annular housing correspondingly facing and positioned with one vertical surface of the right half-annular housing, forming a circular central hole for the column to pass through; one vertical surface of the left half-annular housing and one vertical surface the right half-annular housing are movably hinged with each other through a hinge, and the other vertical surface of the left half-annular housing and the other vertical surface the right half-annular housing are positioned with each other through a magnet; the lamp plate comprises a left half-annular lamp plate and a right half-annular lamp plate respectively connected to the bottom surfaces of the left half-annular housing and the right half-annular housing.

As a first preferred embodiment, the umbrella is a vertical umbrella, and the column passes through the central hole of the housing and is connected to the lower nest and the upper nest; the lower nest has a connecting ring protruding at the bottom surface of the lower nest, and the connecting ring has a connecting interface for electrically connecting to the output end of the solar panel, correspondingly, the housing has an annular groove formed on the inner wall of the top of the left half-annular housing and the right half-annular housing for receiving the connecting ring; the housing has a conductive interface at the annular groove corresponding to the connecting interface; when the connecting ring is positioned inside the annular groove of the housing, the housing is connected to the bottom of the lower nest, and the connecting interface is connected to the conductive interface, accordingly, the electrical energy in the solar panel is supplied to the battery.

As a second preferred embodiment, the umbrella is a hanging umbrella, the housing is connected to the lower nest through a connecting piece, the connecting piece is a cylinder suitable to the central hole of the housing; the connecting piece is an external thread top end with a reduced diameter, and correspondingly the lower nest has an internal thread hole open downward, the external thread top end is threaded connected to the internal thread hole of the lower nest, so that the connecting piece is connected to the lower nest; the connecting piece has a connecting ring protruding below the external thread top end, the connecting ring has a connecting interface for electrically connecting to the output end of the solar panel, correspondingly, the housing has an annular groove formed on the inner wall of the top of the left half-annular housing and the right half-annular housing for receiving the connecting interface; the housing has a conductive interface at the annular groove corresponding to the connecting interface; the housing is sleeved outside the connecting piece, when the connecting ring is positioned inside the annular groove of the housing, the housing is connected to the bottom of the lower nest, and the connecting interface is connected to the conductive interface, accordingly, the electrical energy in the solar panel is supplied to the battery.

Preferably, the left half-annular housing has a positioning chamber for receiving the battery and the speaker; the Bluetooth audio switch and the lighting switch are located at the periphery of the left half-annular housing; a circuit board is located inside the lower nest, the battery, the speaker, the lamps, the LED light bars, the Bluetooth audio switch and the lighting switch are electrically connected with the circuit board through a conductive pin assembly or/and a wire, forming a lighting control circuit and a Bluetooth audio circuit.

Preferably, the lamps are two semi-circular arc-shaped LED lamps respectively disposed inside the left half-annular lamp plate and the right half-annular lamp plate; a plug and a conductive socket are respectively disposed on two adjacent vertical surfaces of the left half-annular housing and the right half-annular housing; the plug and the conductive socket are electrically connected with the circuit board, so that the LED lights are electrically connected with the circuit board through the conductive socket and the plug.

Preferably, the left half-annular housing has a USB interface and a micro interface located above the Bluetooth audio switch.

Preferably, a sound transmission cover and a waterproof cover are disposed on the outside of the housing; the housing is a hollow cylinder, preferably a cylindrical structure.

Compared with the prior art, the present invention has the following advantages: the Bluetooth audio system integrates Bluetooth audio and lighting, and is mounted on the lower end face of the lower nest, greatly increasing the function of the umbrella; a solar panel is mounted on the top of the upper nest, the output end of the solar panel is connected with the battery in the Bluetooth audio by a conductive interface, which is very convenient for disassembly and assembly. The battery supplies power to the product itself and to the umbrella LED light bars through the connector; a Bluetooth audio switch and a lighting switch for controlling the lamps inside the lamp plate and the plurality of LED light bars disposed on the rods are mounted on the housing to realize the function of switching the product lighting and LED light bars on the umbrella. The invention has simple, compact and reasonable structure, convenient operation, Bluetooth sound and lighting functions, and strong practicability. It can be used on the outdoor umbrella of straight umbrella and hanging umbrella, and can be used alone or as an outdoor umbrella accessory.

DETAILED DESCRIPTION OF THE INVENTION

The present invention will be described in further detail with reference to the following embodiments.

Embodiment 1

Figure 1:
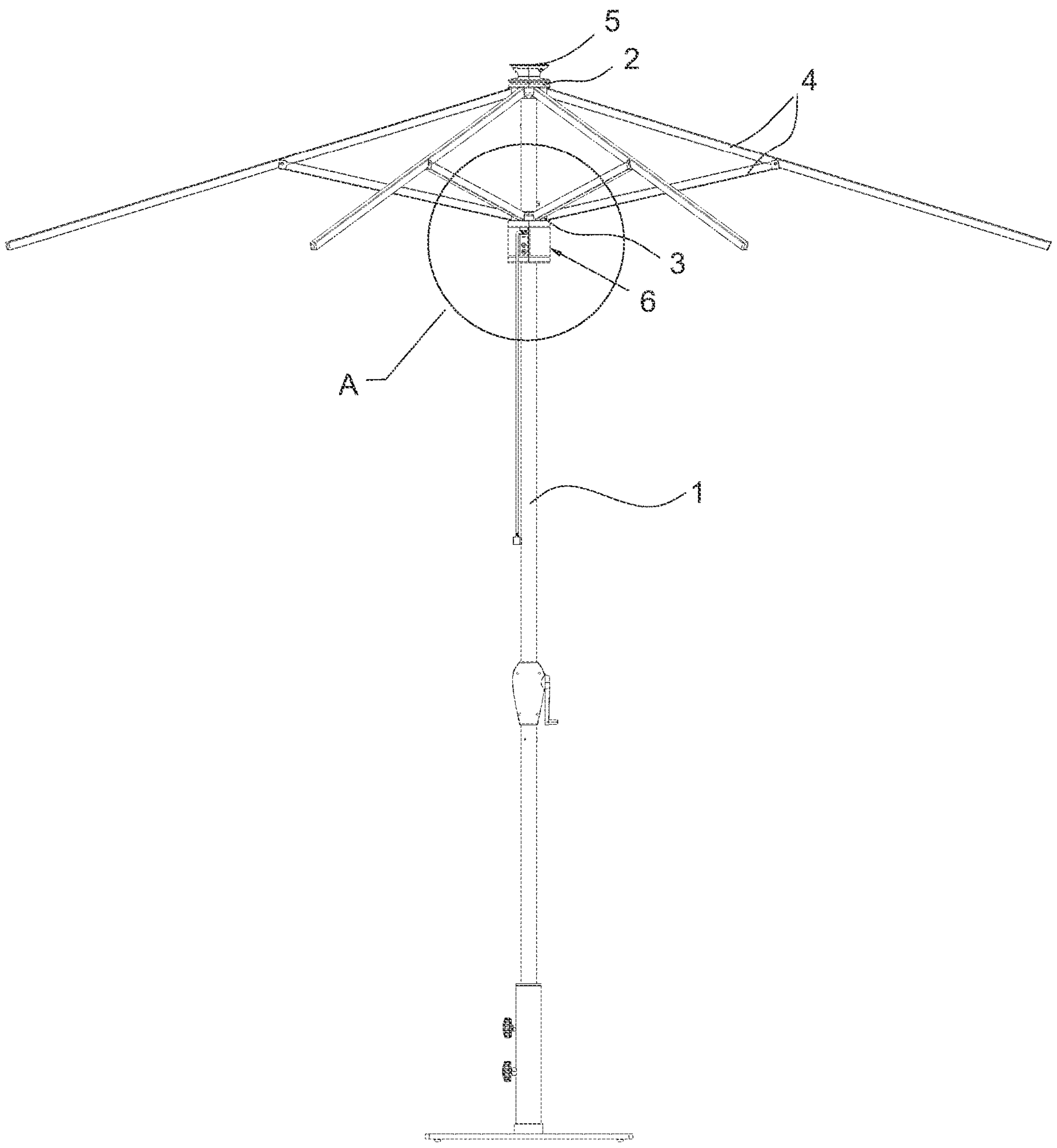
FIG. 1 is a perspective view of a Bluetooth audio system for an umbrella according to Embodiment 1 of the present invention.
Figure 2:
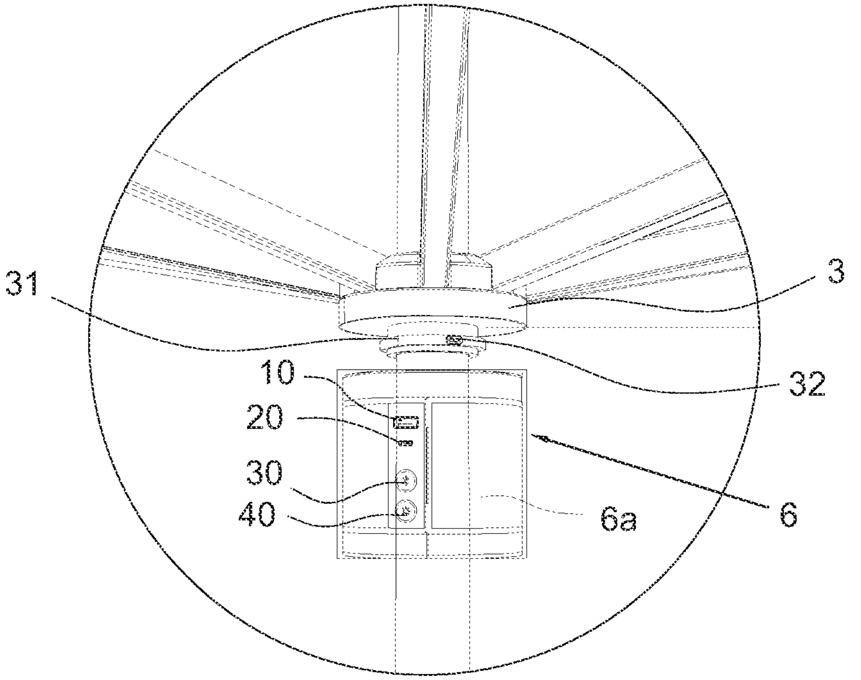
FIG. 2 is a partial enlarged view of Part-A in FIG. 1 according to Embodiment 1 of the present invention.
Figure 3:
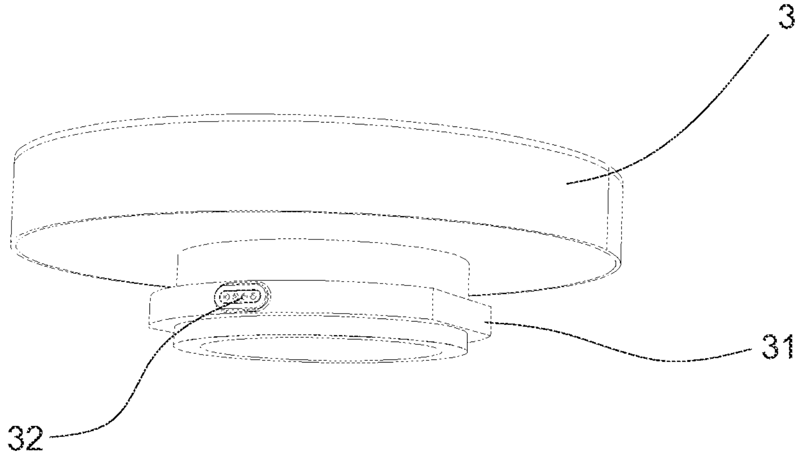
FIG. 3 is a perspective view of a lower nest according to Embodiment 1 of the present invention.
Figure 4:
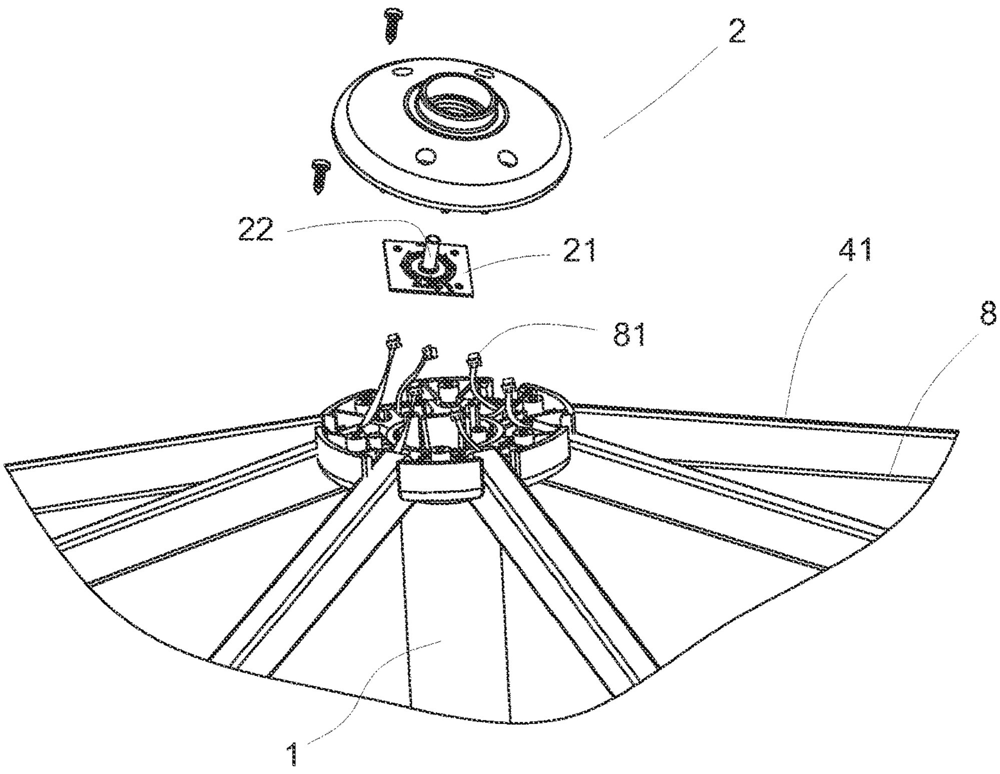
FIG. 4 is an exploded view of an upper nest according to Embodiment 1 of the present invention.
Figure 5:
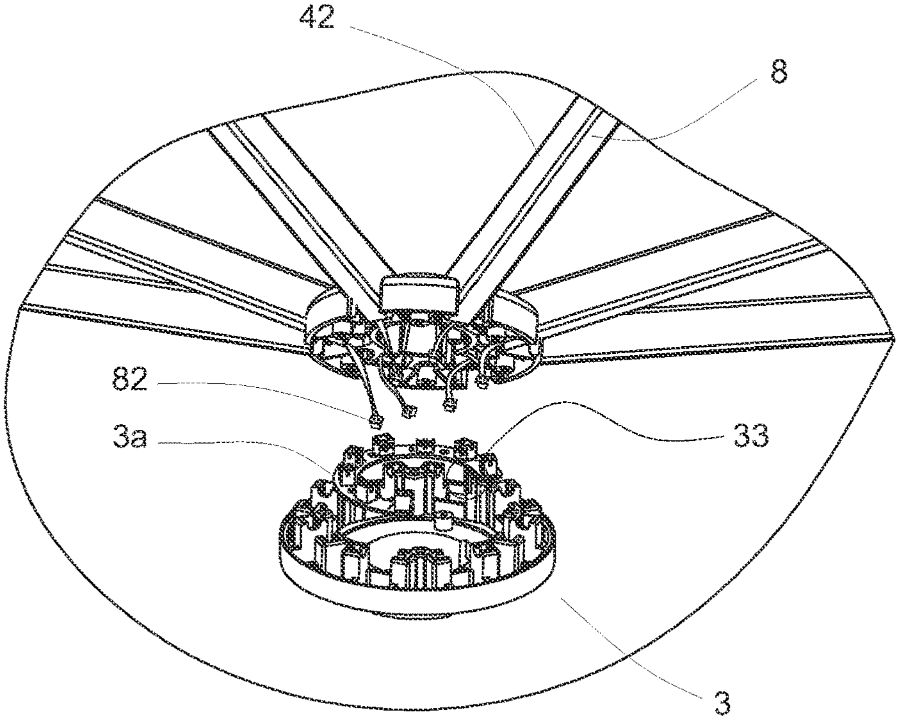
FIG. 5 is an exploded view of the lower nest according to Embodiment 1 of the present invention.

FIGS. 1-8 show a first embodiment of the Bluetooth audio system for an umbrella of the present invention. The umbrella of this embodiment is a vertical umbrella, the umbrella comprises a column 1, an upper nest 2, a lower nest 3 and a plurality of rods 4. A plurality of LED light bars 8 mounted on the plurality of rods 4. Generally, the LED light bars 8 can be disposed in both a long rod 41 and a short rod 42, which are respectively electrically connected with a circuit board in the upper nest 2 and a circuit board in the lower nest 3. As shown in FIGS. 4 and 5, a solar panel 5 having an output end mounted on the top of the upper nest 2, the upper nest 2 has an upper nest circuit board 21, and a DC interface 22 is disposed in the middle of the upper nest circuit board 21. The DC interface 22 extends upward from the upper nest 2 and is electrically connected with the solar panel 5. In addition, the LED light bars 8 having a power line in the long rod 41 are electrically connected through a plug 81 and the socket on the upper nest circuit board 22. Similarly, the lower nest 3 has a lower nest circuit board **3*a*, the power line of the LED light bars 8 in the short rod 42 is electrically connected with a socket 33 on the lower nest circuit board 3*a* through a plug 82, and the lower nest circuit board 3*a* is electrically connected with the top solar panel 5 through a wiring in the column 1**.

The Bluetooth audio system 6 comprises a hollow cylindrical housing **6*a* which is detachably mounted at the bottom of the lower nest 3 of the umbrella. The housing 6*a* is equipped with a battery 63, a speaker 64 and other main components. A lamp plate 6*b* with a plurality of lamps inside is connected to the bottom surface of the housing 6*a*. The housing 6*a* has a conductive interface 67 electrically connected to the output end of the solar panel 5 and the input end of the battery 63; a Bluetooth audio switch 30 and a lighting switch 40 for controlling the lamps inside the lamp plate 6*b* and the plurality of LED light bars 8 are mounted on the housing 6*a***.

Figure 6:
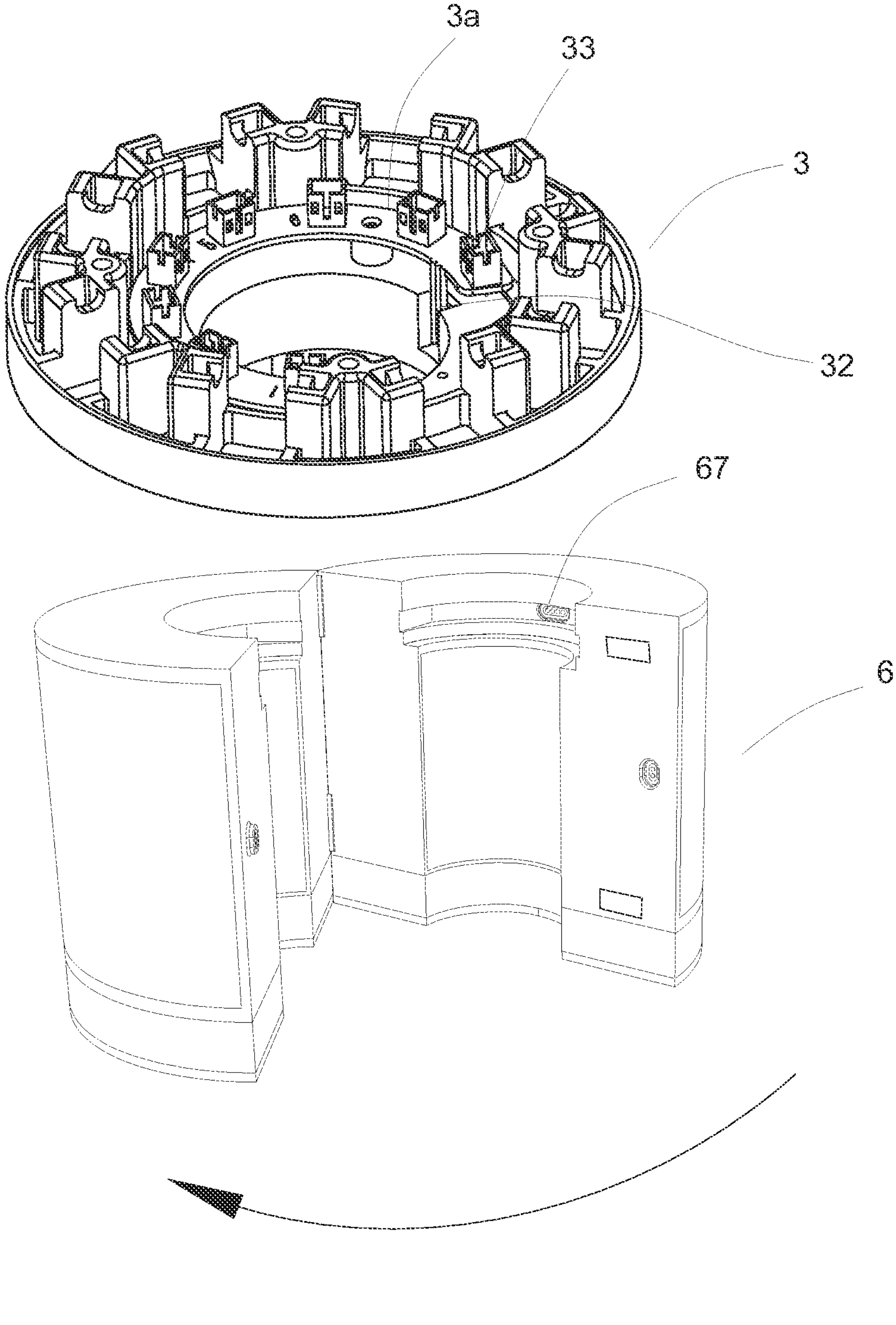
FIG. 6 is a perspective view of an electrical connection between the lower nest and the Bluetooth audio system according to Embodiment 1 of the present invention.
Figure 7:
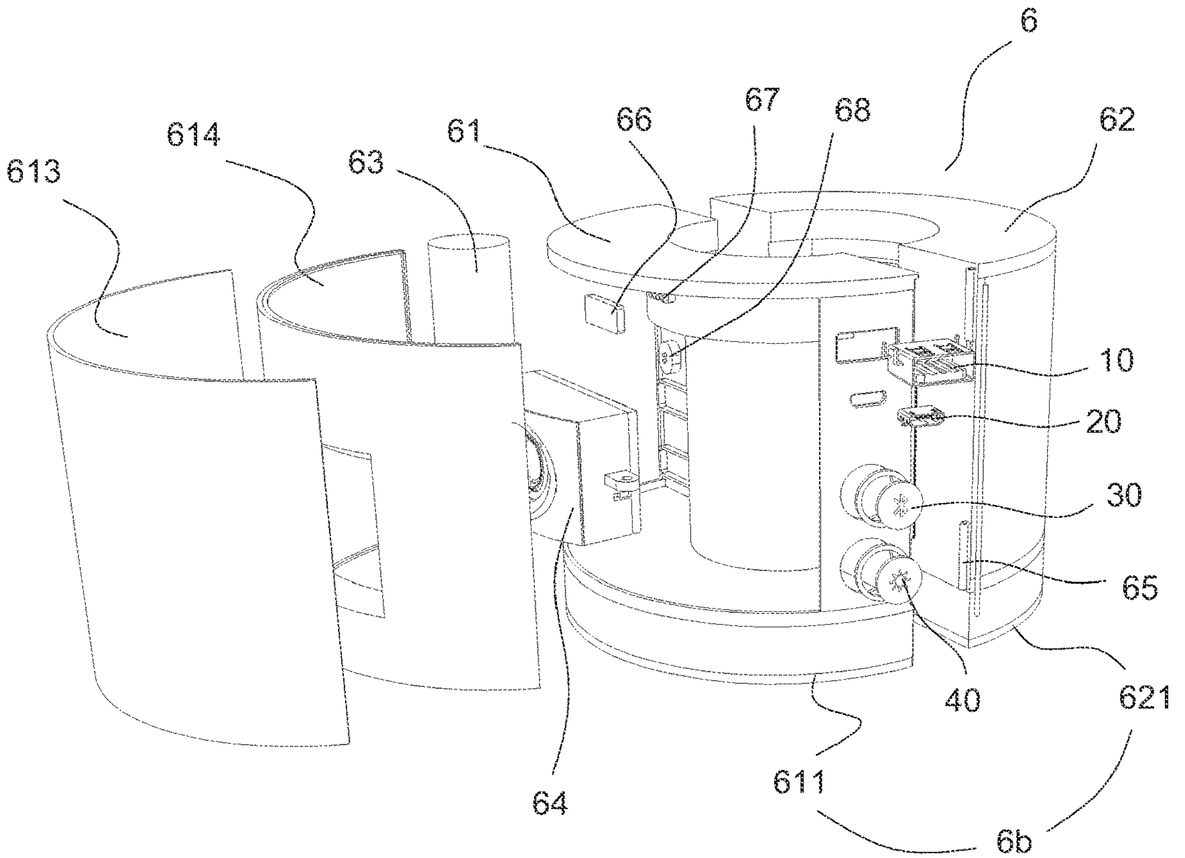
FIG. 7 is an exploded view of the Bluetooth audio system according to Embodiment 1 of the present invention.
Figure 8:
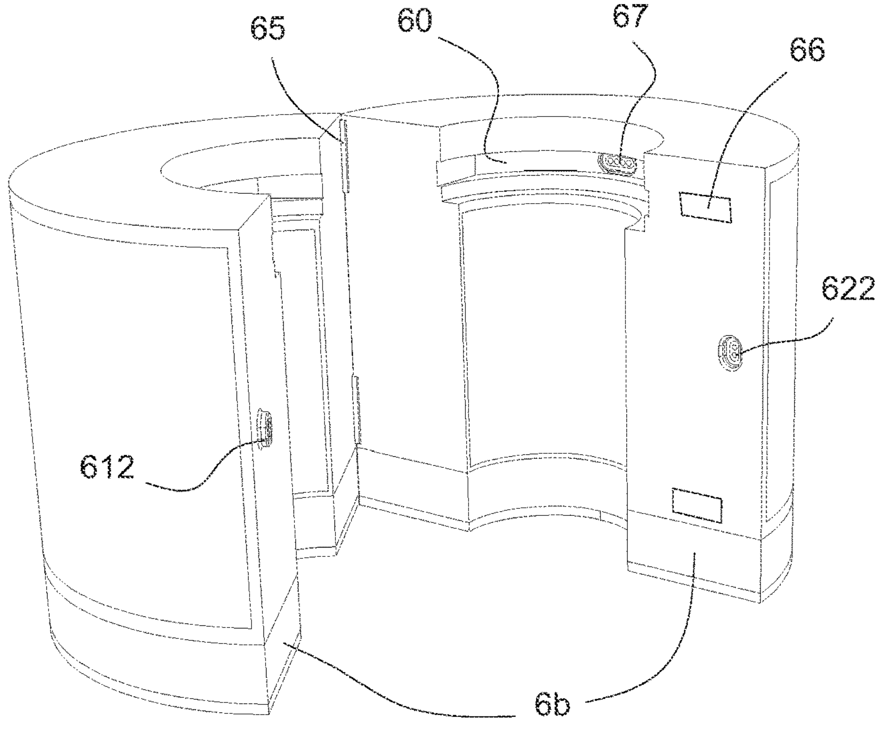
FIG. 8 is a perspective view of a left half-annular housing and a right half-annular housing of the Bluetooth audio system are in a separate state according to Embodiment 1 of the present invention.

The specific structure is as follows: as shown in FIGS. 6-8, the housing **6*a* comprises a left half-annular housing 61 with two vertical surfaces and a right half-annular housing 62 with two vertical surfaces, the left half-annular housing 61 and the right half-annular housing 62 are positioned with the bottom of the lower nest 3 with each vertical surface of the left half-annular housing 61 correspondingly facing and positioned with one vertical surface of the right half-annular housing 62, forming a central hole for the column 1 to pass through. The column 1 passes through the central hole of the housing 6*a* and is connected to the lower nest 3 and the upper nest 2. Generally, the upper nest 2 is fixed on the top of the column 1, while the lower nest 3 is sliding on the column 1. One vertical surface of the left half-annular housing 61 and one vertical surface the right half-annular housing 62 are movably hinged with each other through a hinge 65, and the other vertical surface of the left half-annular housing 61 and the other vertical surface the right half-annular housing 62 are positioned with each other through a magnet 66 to form a cylindrical structure; the lamp plate 6*b* comprises a left half-annular lamp plate 611 and a right half-annular lamp plate 621 respectively connected to the bottom surfaces of the left half-annular housing 61 and the right half-annular housing 62. The lower nest 3 has a connecting ring 31 protruding at the bottom surface of the lower nest 3, and the connecting ring 31 has a connecting interface 32 for electrically connecting to the output end of the solar panel 5, correspondingly, the housing 6*a* has an annular groove 60 formed on the inner wall of the top of the left half-annular housing 61 and the right half-annular housing 62 for receiving the connecting ring 31; the housing 6*a* has a conductive interface 67 at the annular groove 60 corresponding to the connecting interface 32; when the connecting ring 31 is positioned inside the annular groove 60 of the housing 6*a*, the housing 6*a* is connected to the bottom of the lower nest 3, and the connecting interface 32 is connected to the conductive interface 67, accordingly, the electrical energy in the solar panel 5 is supplied to the battery 63. The left half-annular housing 61 has a positioning chamber for receiving the battery 63 and the speaker 64; the Bluetooth audio switch 30 and the lighting switch 40 are located at the periphery of the left half-annular housing 61; a circuit board 3*a* is located inside the lower nest 3, the battery 63, the speaker 64, the lamps, the LED light bars 8, the Bluetooth audio switch 30 and the lighting switch 40 are electrically connected with the circuit board 3*a* of the lower nest 3 through a conductive pin assembly 68 or/and a wire, forming a lighting control circuit and a Bluetooth audio circuit, these circuits are conventional technology. The lamps are two semi-circular arc-shaped LED lamps respectively disposed inside the left half-annular lamp plate 611 and the right half-annular lamp plate 621; a plug 612 and a conductive socket 622 are respectively disposed on two adjacent vertical surfaces of the left half-annular housing 61 and the right half-annular housing 62; the plug 612 and the conductive socket 622 are connected with the conductive interface 67 through wiring, and then electrically connected with the circuit board 3*a* though the connection interface 32, so that the LED lights are electrically connected with the circuit board 3*a* through the conductive socket 622 and the plug 612, forming a part of the lighting control circuit. The left half-annular housing 61 has a USB interface 10 and a micro interface 20 located above the Bluetooth audio switch 30 to facilitate the charging of mobile phones, laptops, etc., and the battery 63 can also be charged by external power. A sound transmission cover 614 and a waterproof cover 613 are disposed on the outside of the housing 6*a***.

During installation, first separate the left half-annular housing 61 from the right half-annular housing 62, align the annular groove 60 with the connecting ring 31 of the lower nest 3, and align the conductive interface 67 with the connecting interface 32. Then close the left half-annular housing 61 and the right half-annular housing 62, and fix them through the magnet 66, that is, complete the installation.

When in use, music can be played through the Bluetooth audio switch 30, and the lighting switch 40 can realize the switching of the lamp and the LED light bars lighting.

Embodiment 2

Figure 9:
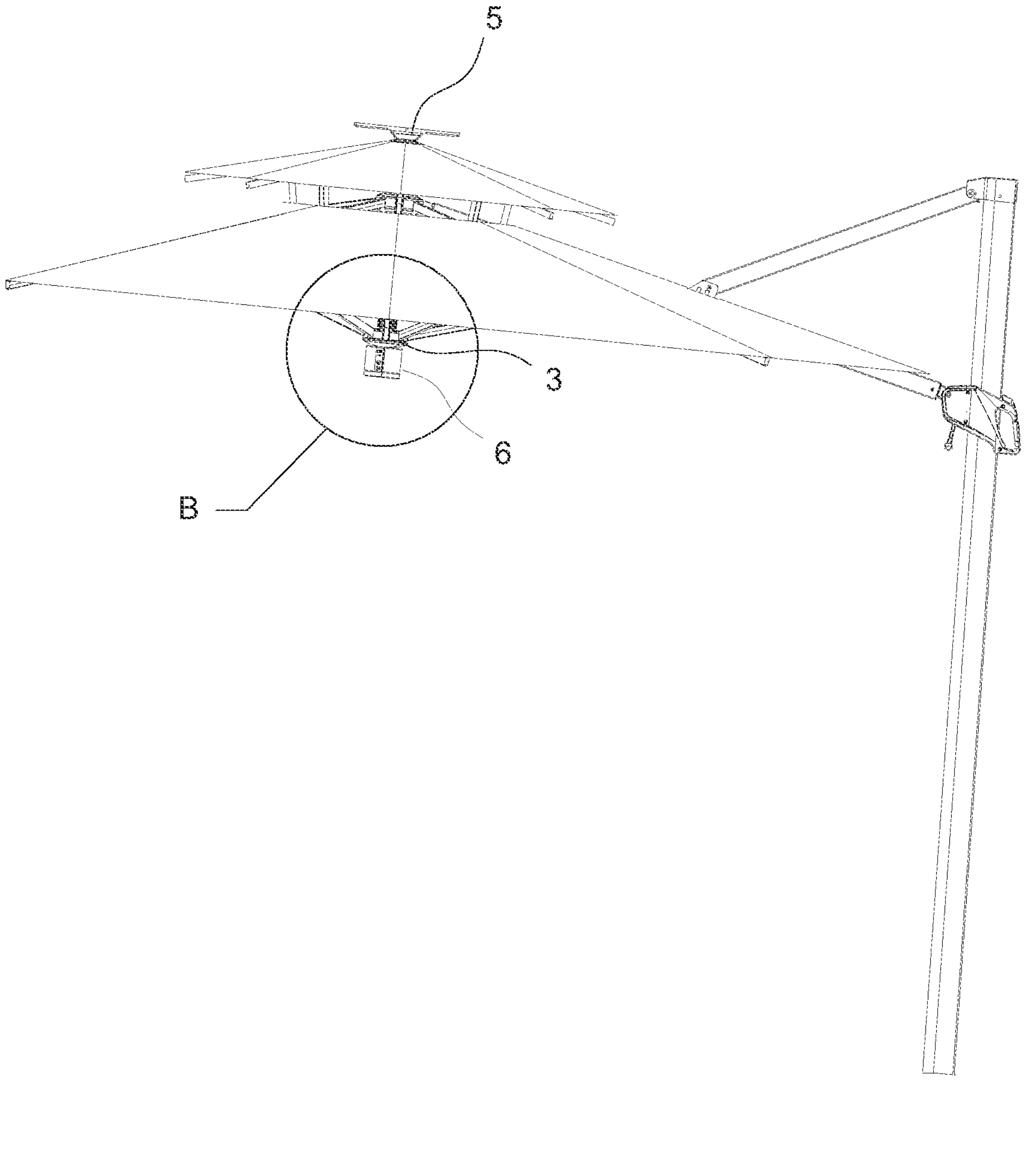
FIG. 9 is a perspective view of an Bluetooth audio system for an umbrella according to Embodiment 2 of the present invention.
Figure 10:
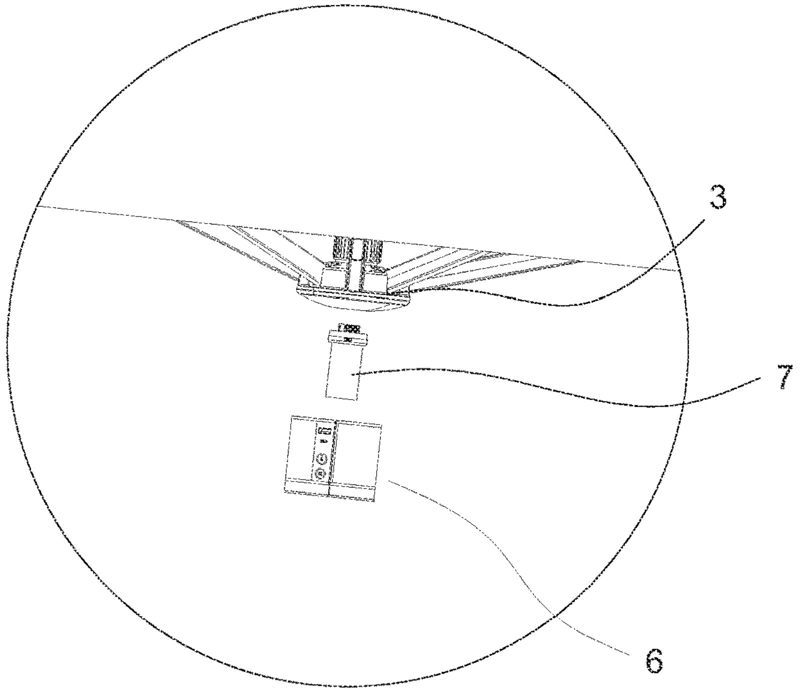
FIG. 10 is a partial enlarged view of Part-B in FIG. 9 according to Embodiment 2 of the present invention.
Figure 11:
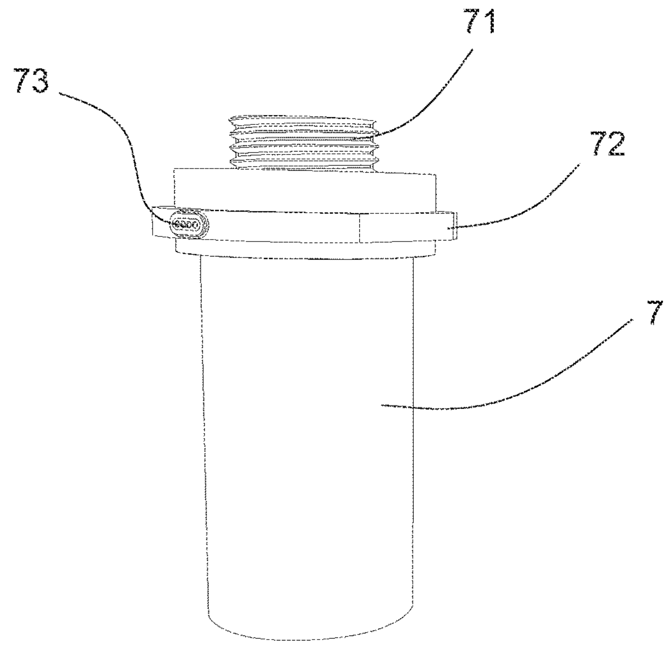
FIG. 11 is a perspective view of a connecting piece according to Embodiment 2 of the present invention.

FIGS. 9-11 show a second embodiment of the Bluetooth audio system for an umbrella of the present invention. The Bluetooth audio system of the second embodiment is different from Embodiment 1 in that, the umbrella of this embodiment is a hanging umbrella, the umbrella comprises an upper nest 2, a lower nest 3 and a plurality of rods 4. A plurality of LED light bars 8 are mounted on the plurality of rods 4, and a solar panel 5 having an output end is mounted on the top of the upper nest 2. The structure of Bluetooth audio system 6 is consistent with Embodiment 1. The housing of Bluetooth audio system 6 is connected to the lower nest 3 through a connecting piece 7, the connecting piece 7 is a cylinder suitable to the central hole of the housing **6*a*; the connecting piece 7 is an external thread top end 71 with a reduced diameter, and correspondingly the lower nest 3 has an internal thread hole open downward, the external thread top end 71 is threaded connected to the internal thread hole of the lower nest 3, so that the connecting piece 7 is connected to the lower nest 3; the connecting piece 7 has a connecting ring 72 protruding below the external thread top end 71, the connecting ring 72 has a connecting interface 73 for electrically connecting to the output end of the solar panel 5, correspondingly, the housing 6*a* has an annular groove 60 formed on the inner wall of the top of the left half-annular housing 61 and the right half-annular housing 62 for receiving the connecting interface 73; the housing 6*a* has a conductive interface 67 at the annular groove 60 corresponding to the connecting interface 73; the housing 6*a* is sleeved outside the connecting piece 7, when the connecting ring 72 is positioned inside the annular groove 60 of the housing 6*a*, the housing 6*a* is connected to the bottom of the lower nest 3, and the connecting interface 32 is connected to the conductive interface 67, accordingly, the electrical energy in the solar panel 5 is supplied to the battery 63**. Other structures are consistent with Embodiment 1.

During installation, first separate the left half-annular housing 61 and the right half-annular housing 62, insert the connecting piece 7 into the left half-annular housing 61 and the right half-annular housing 62, align the annular groove 60 with the connecting ring 72 of the connecting piece 7, and align the conductive interface 67 with the connecting interface 73, then close the left half-annular housing 61 and the right half-annular housing 62, and fix them through the magnet 66 to form a cylindrical structure, and then screw the external thread top end 71 at the upper end of the connecting piece 7 into the threaded hole of the lower nest 3, which completes the installation.

When in use, music can be played through the Bluetooth audio switch 30, and the lighting switch 40 can realize the switching of the lamp and the LED light bars lighting.

The protection scope of the present invention is not limited to each embodiments described in this description. Any changes and replacements made on the basis of the scope of the present invention patent and of the description shall be included in the scope of the present invention patent.

The invention claimed is:

1. A Bluetooth audio system for an umbrella, the umbrella comprising:

a column;

an upper nest having a top, the upper nest being attached to the column;

a lower nest having a bottom, the lower nest being mounted on the column;

a plurality of rods connected to the upper nest;

a plurality of LED light bars mounted on the plurality of rods;

a solar panel having an output end mounted on the top of the upper nest; and the Bluetooth audio system;

wherein the Bluetooth audio system comprises a housing having a bottom surface detachably mounted at the bottom of the lower nest of the umbrella;

a battery having an input end disposed inside the housing; and a speaker disposed inside the housing;

the housing has a conductive interface electrically connected to the output end of the solar panel and the input end of the battery;

a lamp plate with a plurality of lamps inside is connected to the bottom surface of the housing; and a Bluetooth audio switch and a lighting switch for controlling the lamps inside the lamp plate and the plurality of LED light bars are mounted on the housing.

2. The Bluetooth audio system of claim 1, wherein the housing comprises a left half-annular housing with two vertical surfaces and a right half-annular housing with two vertical surfaces, the left half-annular housing and the right half-annular housing are positioned with the bottom of the lower nest with each vertical surface of the left half-annular housing correspondingly facing and positioned with one vertical surface of the right half-annular housing, forming a central hole for the column to pass through;

one vertical surface of the left half-annular housing and one vertical surface the right half-annular housing are movably hinged with each other through a hinge, and the other vertical surface of the left half-annular housing and the other vertical surface the right half-annular housing are positioned with each other through a magnet;

the lamp plate comprises a left half-annular lamp plate and a right half-annular lamp plate respectively connected to the bottom surfaces of the left half-annular housing and the right half-annular housing.

3. The Bluetooth audio system of claim 2, wherein the umbrella is a vertical umbrella, and the column passes through the central hole of the housing and is connected to the lower nest and the upper nest;

the lower nest has a connecting ring protruding at the bottom surface of the lower nest, and the connecting ring has a connecting interface for electrically connecting to the output end of the solar panel, correspondingly, the housing has an annular groove formed on the inner wall of the top of the left half-annular housing and the right half-annular housing for receiving the connecting ring;

the housing has a conductive interface at the annular groove corresponding to the connecting interface;

when the connecting ring is positioned inside the annular groove of the housing, the housing is connected to the bottom of the lower nest, and the connecting interface is connected to the conductive interface, accordingly, the electrical energy in the solar panel is supplied to the battery.

4. The Bluetooth audio system of claim 2, wherein the umbrella is a hanging umbrella, the housing is connected to the lower nest through a connecting piece, the connecting piece is a cylinder suitable to the central hole of the housing;

the connecting piece is an external thread top end with a reduced diameter, and correspondingly the lower nest has an internal thread hole open downward, the external thread top end is threaded connected to the internal thread hole of the lower nest, so that the connecting piece is connected to the lower nest;

the connecting piece has a connecting ring protruding below the external thread top end, the connecting ring has a connecting interface for electrically connecting to the output end of the solar panel, correspondingly, the housing has an annular groove formed on the inner wall of the top of the left half-annular housing and the right half-annular housing for receiving the connecting interface;

the housing has a conductive interface at the annular groove corresponding to the connecting interface;

the housing is sleeved outside the connecting piece, when the connecting ring is positioned inside the annular groove of the housing, the housing is connected to the bottom of the lower nest, and the connecting interface is connected to the conductive interface, accordingly, the electrical energy in the solar panel is supplied to the battery.

5. The Bluetooth audio system of claim 3, wherein the left half-annular housing has a positioning chamber for receiving the battery and the speaker;

the Bluetooth audio switch and the lighting switch are located at the periphery of the left half-annular housing;

a circuit board is located inside the lower nest, the battery, the speaker, the lamps, the LED light bars, the Bluetooth audio switch and the lighting switch are electrically connected with the circuit board through a conductive pin assembly or/and a wire, forming a lighting control circuit and a Bluetooth audio circuit.

6. The Bluetooth audio system of claim 5, wherein the lamps are two semi-circular arc-shaped LED lamps respectively disposed inside the left half-annular lamp plate and the right half-annular lamp plate;

a plug and a conductive socket are respectively disposed on two adjacent vertical surfaces of the left half-annular housing and the right half-annular housing;

the plug and the conductive socket are electrically connected with the circuit board, so that the LED lights are electrically connected with the circuit board through the conductive socket and the plug.

7. The Bluetooth audio system of claim 6, wherein the left half-annular housing has a USB interface and a micro interface located above the Bluetooth audio switch.

8. The Bluetooth audio system of claim 7, wherein a sound transmission cover and a waterproof cover are disposed on the outside of the housing.

9. The Bluetooth audio system of claim 1, wherein the housing is a hollow cylinder.

* * * * *